United States Patent [19]

Watanabe

[11] Patent Number: 5,467,235
[45] Date of Patent: Nov. 14, 1995

[54] LID MECHANISM, FOR RECORDING-MEDIUM INSERTION OPENING, HAVING LID DEFORMATION CONTROL CONSTRUCTION

[75] Inventor: Takashi Watanabe, Ichikawa, Japan

[73] Assignee: TEAC Corporation, Japan

[21] Appl. No.: 147,684

[22] Filed: Nov. 4, 1993

[30] Foreign Application Priority Data

Dec. 25, 1992 [JP] Japan .................. 4-089018 U

[51] Int. Cl.⁶ .................................................. G11B 17/04
[52] U.S. Cl. ........................... 360/99.06; 360/99.02; 369/77.1
[58] Field of Search ........................... 360/99.02, 99.06, 360/98.04, 98.06; 369/77.1, 77.2; 206/444

[56] References Cited

U.S. PATENT DOCUMENTS 4,743,991  5/1988  Akiyama ..................... 369/77.2

FOREIGN PATENT DOCUMENTS 61-142561  6/1986  Japan ..................... 369/77.1
330688  11/1992  Japan .

*Primary Examiner*—Stuart S. Levy
*Assistant Examiner*—David L. Ometz
*Attorney, Agent, or Firm*—Andrus, Sceales, Starke & Sawall

[57] ABSTRACT

An axis mechanism supports a lid on a periphery of an opening so that the lid can rotate about a rotational axis. At least a part of the lid can move along a direction perpendicular to the rotational axis in a manner different from the manner of the rotational movement about the rotational axis. The opening is used to pass at least a part of a recording medium therethrough and the lid opens as a result of being rotated about the rotational axis due to being pressed by the recording medium. A preventing member prevents the lid from being overly deformed due to being pressed by the recording medium, the preventing member being fixed adjacent to the lid so that at least a part of the lid comes in contact with the preventing member if the lid is deformed by more than a predetermined degree, the deformation of the lid being caused as a result of a part of the lid being moved along a direction perpendicular to the rotational axis in a manner different from the rotational movement about the rotational axis as the axis mechanism allows such a movement.

6 Claims, 5 Drawing Sheets

LID MECHANISM, FOR
RECORDING-MEDIUM INSERTION
OPENING, HAVING LID DEFORMATION
CONTROL CONSTRUCTION

BACKGROUND OF THE INVENTION

The present invention relates to a lid mechanism for a recording medium insertion opening. In particular, the present invention relates to a lid mechanisms constructed so that an overly great deformation of a lid, which may occur due to the lid being pressed by a recording medium at a time of insertion thereof, may be prevented.

One example of such a lid mechanism according to the related art will now be described. A recording/reproducing apparatus such as a magnetic disc apparatus uses a disc cartridge which contains a disc, used as an essential recording medium, such as a flexible magnetic disc. Such a disc cartridge is inserted into the disc apparatus so as to be loaded thereon. There, the disc cartridge is inserted into the disc apparatus by passing the cartridge through a disc insertion opening formed in a front bezel of the disc apparatus. This disc cartridge insertion action causes the magnetic disc in the disc cartridge to be loaded on a turn table provided in the disc apparatus. As a result of the magnetic disc's being loaded on the turn table, data can be written on the magnetic disc and can be read therefrom through the function of the disc apparatus.

There are two types of lid mechanisms for recording-medium insertion openings, according to the related art, as shown in FIGS.1 and 2. In FIG.1, a lid 1 is assembled in the front bezel 3 while in FIG. 2 the lid 1 is assembled in a frame 4 of the disc apparatus.

In FIG.1, the lid 1 has three shafts 2, respectively located at each side and at the lid's middle part. Each shaft is fitted into a supporting hole 3a formed on the front bezel 3. Thus, the lid 1 is rotatably supported on the front bezel 3. In this construction, as the disc cartridge, not shown in FIG.1, is inserted into the disc insertion opening 3b, the lid 1 is pressed and caused to move into the disc apparatus, by the advancing edge of the inserted disc cartridge. As a result, the lid is rotated into the disc apparatus about the three shafts 2 rotatably supported by the respective supporting holes 3a. This rotation action of the lid 1 causes the disc insertion opening 3b to assume the opening state thereof.

In FIG.2, the lid 1 has two sideward-projecting shafts 2, one projecting from each side thereof, which shafts are fitted into respective supporting holes 4a formed on the frame 4. Thus, the lid 1 is rotatably supported on the frame 4. After mounting the lid 1 onto the frame 4, backward projecting hook 5, one projecting from each side of the front bezel 3, are fitted into respective mounting holes 4b. The lid 1 causes the disc insertion opening 3b formed in the front bezel 3 to be either in its opening state or in its closing state by pivoting about the side shafts 2 rotatably supported on the frame 4.

Recently, it has become desirable to reduce a thickness of such a disc apparatus. In order to reduce the thickness, the member, constituting the front bezel 3, located above the disc insertion opening 3b should be made smaller. In order to make this member smaller, the supporting hole 3a for the shaft 2 mounted on the middle part of the lid should be eliminated in FIG.1. In order to thin the disc apparatus further, a volume located to an axis mechanism is made smaller, the axis mechanism comprising the shafts 2 and the supporting holes 3a. Further, concerning a state of the lid 1 where the lid 1 is open, the thickness of the lid 1 should be made thinner. Consequently, as mentioned above, the supporting hole 3a for the shaft 2 mounted on the middle part of the lid should be eliminated in FIG.1.

Therefore, the lid mechanism for the recording-medium insertion opening as shown in FIG.2 tends to be used in many cases. The construction of FIG.2, however, has the following problems. As the lid 1 is rotatably supported by the axis mechanism including only the shafts 2 located at each side of the lid 1, the structural strength of the middle part of the lid 1 may not be sufficiently strong. Further, as the thickness of the lid 1 is made thinner as mentioned above, the structural strength throughout the lid 1 is reduced.

Such reduction in the structural strength of the construction of the lid 1 may cause the following problems. The lid 1 may become warped in shape, as shown in FIG.3, due to being pressed by the disc cartridge 6 (drawn by dashed lines) at the time of disc cartridge insertion through the disc insertion opening 3b of the bezel 3. Such phenomena may occur as a result of the disc cartridge 6 being inserted in a manner such that the advancing edge of the disc cartridge 6 is not in parallel to the rotational axis, of the lid 1, corresponding to a straight line connected between the two shafts 2, for example. As a result of such an insertion operation, the lid 1 may become deformed so that the middle part thereof projects into the disc apparatus. Such a warping deformation of the lid 1 may cause the shaft(s) 2 of the lid 1 to become removed from the supporting hole(s) 4a of the frame 4.

SUMMARY OF THE INVENTION

An object of the present invention is to provide a lid mechanism for recording-medium insertion opening by which such problems will not occur.

To achieve the above object of the present invention, a lid mechanism according to the present invention comprises the following:

an axis mechanism for supporting a lid on a periphery of an opening so that said lid can rotate about a rotational axis thereof, at least a part of said lid being movable along a direction perpendicular to said rotational axis in a manner different from the manner of the rotational movement about said rotational axis, wherein said opening is used to pass at least a part of a recording medium therethrough and said lid is opened as a result of being rotated about said rotational axis due to being pressed by said recording medium; and a preventing member for preventing said lid from being overly deformed as a result of being pressed by said recording medium, said preventing member being fixed adjacent to said lid so that at least a part of the lid comes in contact with said preventing member if said part of the lid is deformed by a more than predetermined amount, the deformation of said lid being caused as a result of a part of said lid being moved along a direction perpendicular to said rotational axis in a manner different from the manner of the rotational movement about said rotational axis.

The preventing member prevents over-deformation of the lid even if a thin lid is used and the axis mechanism includes only the provisions located at each side of the lid.

Other objects and further features of the present invention will become more apparent from the following detailed description when read in conjunction with the accompanying drawings.

DESCRIPTION OF THE PREFERRED EMBODIMENTS

Figure 4:
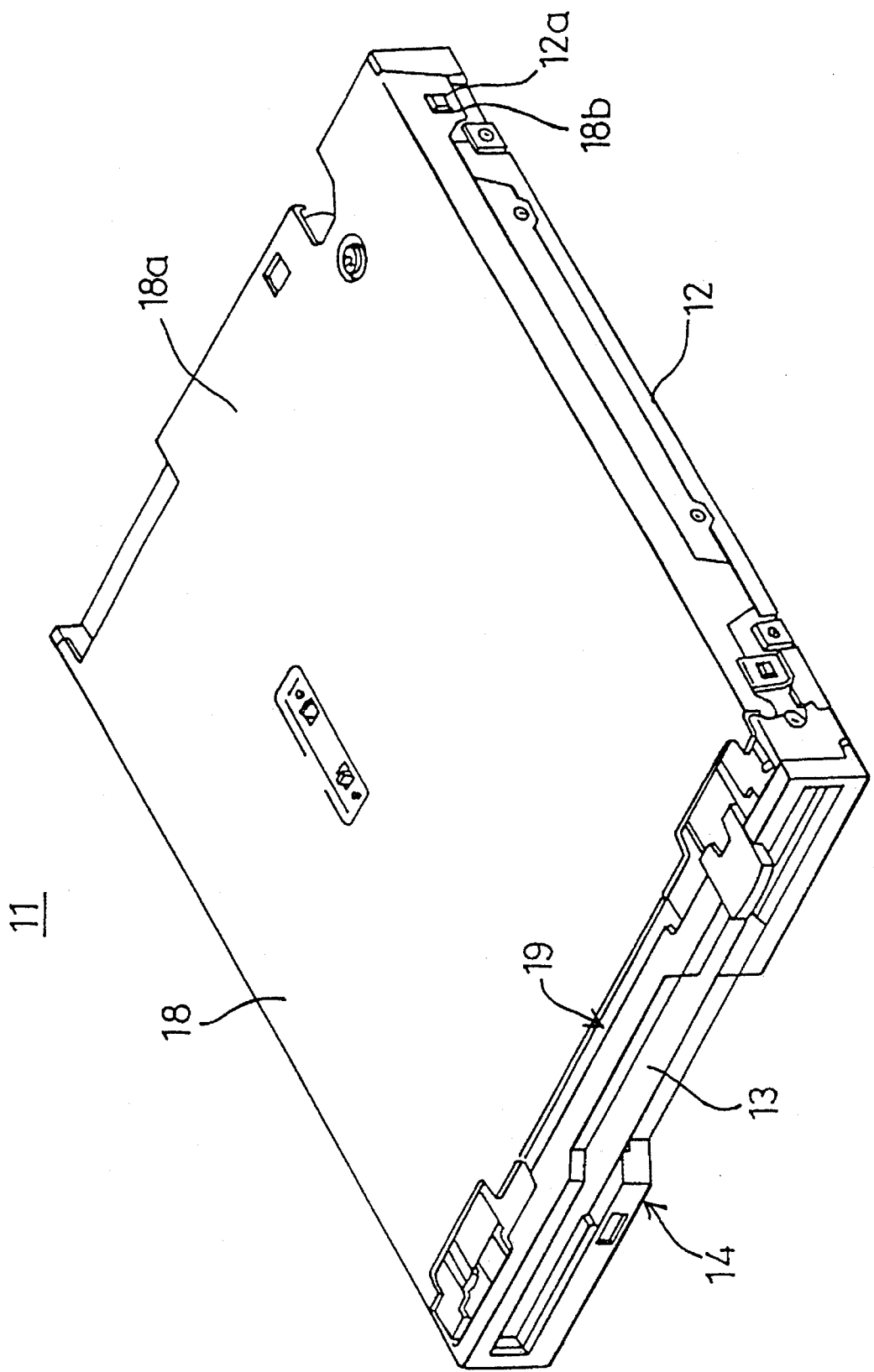
FIG.4 shows a perspective view of a magnetic disc apparatus in which an embodiment of a lid mechanism according to the present invention may be used.

An embodiment of a lid mechanism for recording-medium insertion opening according to the present invention will now be described with reference to FIGS.4, 5 and 6.

In each drawing, a magnetic disc loading mechanism (not shown in the drawings) is provided on a frame 12 made from aluminum die-casting in a magnetic disc apparatus 11. Further, a front bezel 14, having a disc insertion opening 13, is mounted on the front of the frame 12, as by means of projection 14a that engages a corresponding depression in frame 12.

The lid mechanism 15, embodying a lid mechanism for a recording-medium insertion opening according to the present invention, is provided at the rear side of the front bezel 14, the lid mechanism 15 opening/closing the disc insertion opening 13. The lid mechanism 15 comprises a lid 16 extending so as to be shaped like a thin plate. The lid mechanism 15 further comprises a torsion spring (not shown in the drawings) biasing the lid 16 along a direction, the movement of the lid 16 along this direction causing the disc insertion opening 13 to be shut. The lid mechanism 15 further comprises stoppers 19a, 19b and 19c being described below. Shafts 17a and 17b outwardly project from a corresponding side of the lid 16, and being fitted into respective supporting holes 12a formed on the respective side walls of the frame 12. Thus, the lid 16 is supported on the frame, rotatably, about an axis mechanism comprising the shafts 17a and 17b and the supporting holes formed on the frame 12.

The magnetic disc apparatus 11 further comprises a shielding cover 18 having a shape, a cross sectional view of which shape is like an overturned letter U with angular corners. Such a shape is made by downwardly bending both sides of the plate constituting the shielding cover 18. Fastening holes 18b are formed on both side walls of the shielding cover 18, respective fastening projections 12a formed on both sides of the frame 12 being fitted into the fastening holes so that the shielding cover and the frame 12 are integrated with one another. A top plate 18a of the shielding cover 18 has a preventing extension 19 formed at the front thereof. The preventing extension 19 comprises the above-mentioned three stoppers 19a, 19b and 19c. The first stopper 19a projects frontward from the middle part of the preventing extension 19, while the second and third stoppers 19b and 19c are respectively bent downward from each side of the front edge of the preventing extension 19.

The first stopper 19a is located near a concavity 20 formed on the middle part of the top of the lid 15. In this construction, the bottom surface of the concavity 20 comes into contact with the bottom surface of the first stopper 19a, while the lid 15 is at its closing state wherein the lid 15 shuts the disc insertion opening 13. Thus, the first stopper 19a acts to prevent the middle part of the lid 16 from moving upward or acts to prevent the lid 16 from warping such that the middle part thereof projects upward. There, the closing state of the lid is a state where the lid 16 extends vertically. While the lid 16 is at its opening state, the bottom surface of the concavity 20 is in a state apart from the first stopper 19a so that the first stopper 19a does not obstruct the opening/closing (rotational or pivotal) action of the lid 16.

Further, the respective second and third stoppers 19b and 19c are located so as to face the rotation axis corresponding to a line connecting between both ends' shafts 17a and 17b. The respective stoppers 19b and 19c are also facing, and are located in the proximity of, the respective projections 21 and 22 projecting upwardly from the top of the lid 16 at the respective sides of the concavity 20. Respective shapes of the projections 21 and 22 are approximate circles. As shown in FIG.6, the respective projections 21 and 22 are located, when in the opening state as well as when in the closing state of the lid 16, so as to be facing, and so as to be separated with a very small clearance a from, the respective second and third stoppers 19b and 19c.

Further, recesses 16b are provided on the back surface 16a of the lid 16. The recesses 16b are located so that the bottom edges of the second and third stoppers 19b and 19c are inserted thereinto at the opening state of the lid 16. Thus, the recesses 16b act to prevent the lid 16 from coming into contact with the bottom edges of the second and third stoppers 19b and 19c at the lid's opening state. Consequently, smooth opening/closing action of the lid 16 is ensured by avoiding obstruction by the stoppers 19b and 19c.

Figure 1:
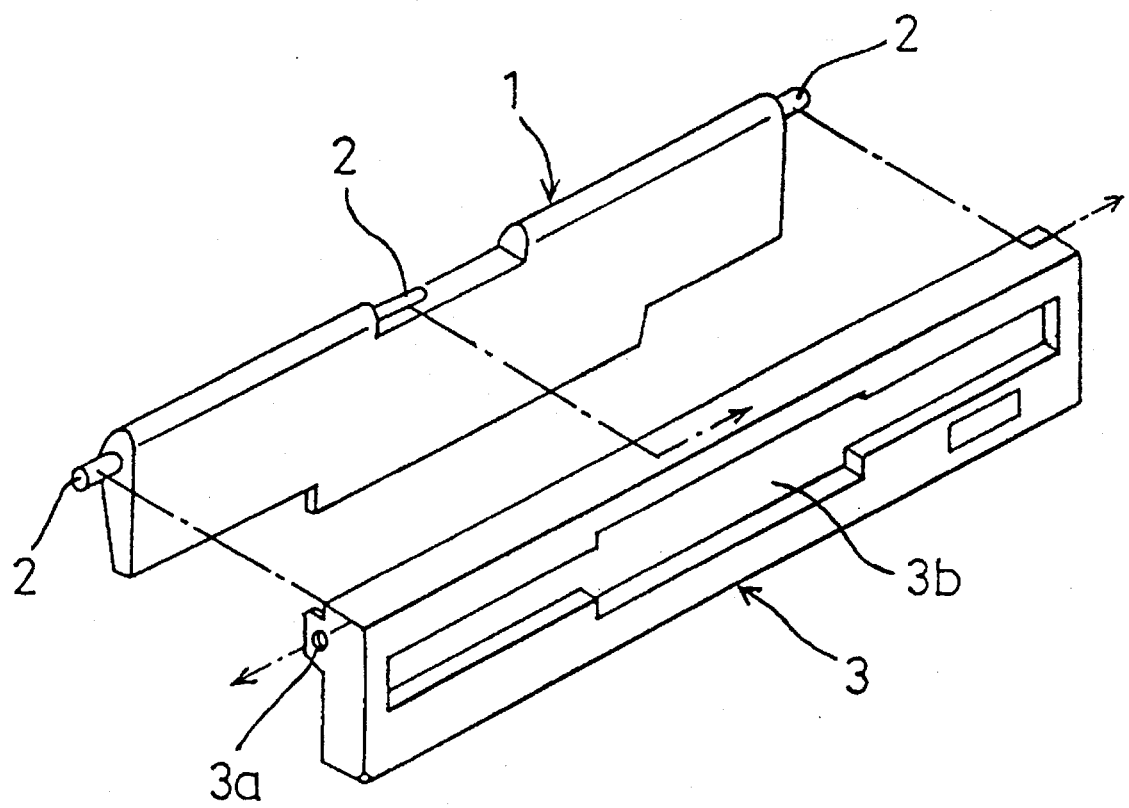
FIG.1 shows an exploded perspective view of an example of a lid mechanism for a recording-medium insertion opening, according to related art.
Figure 2:
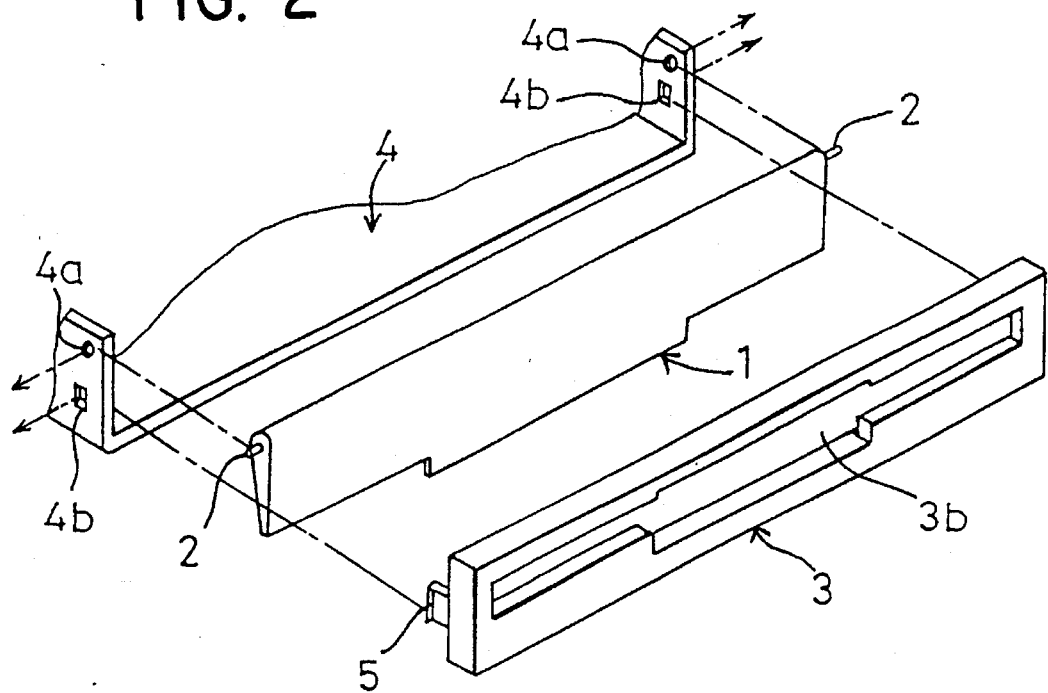
FIG.2 shows an exploded perspective view of another example of a lid mechanism, for a recording-medium insertion opening, according to related art.
Figure 5:
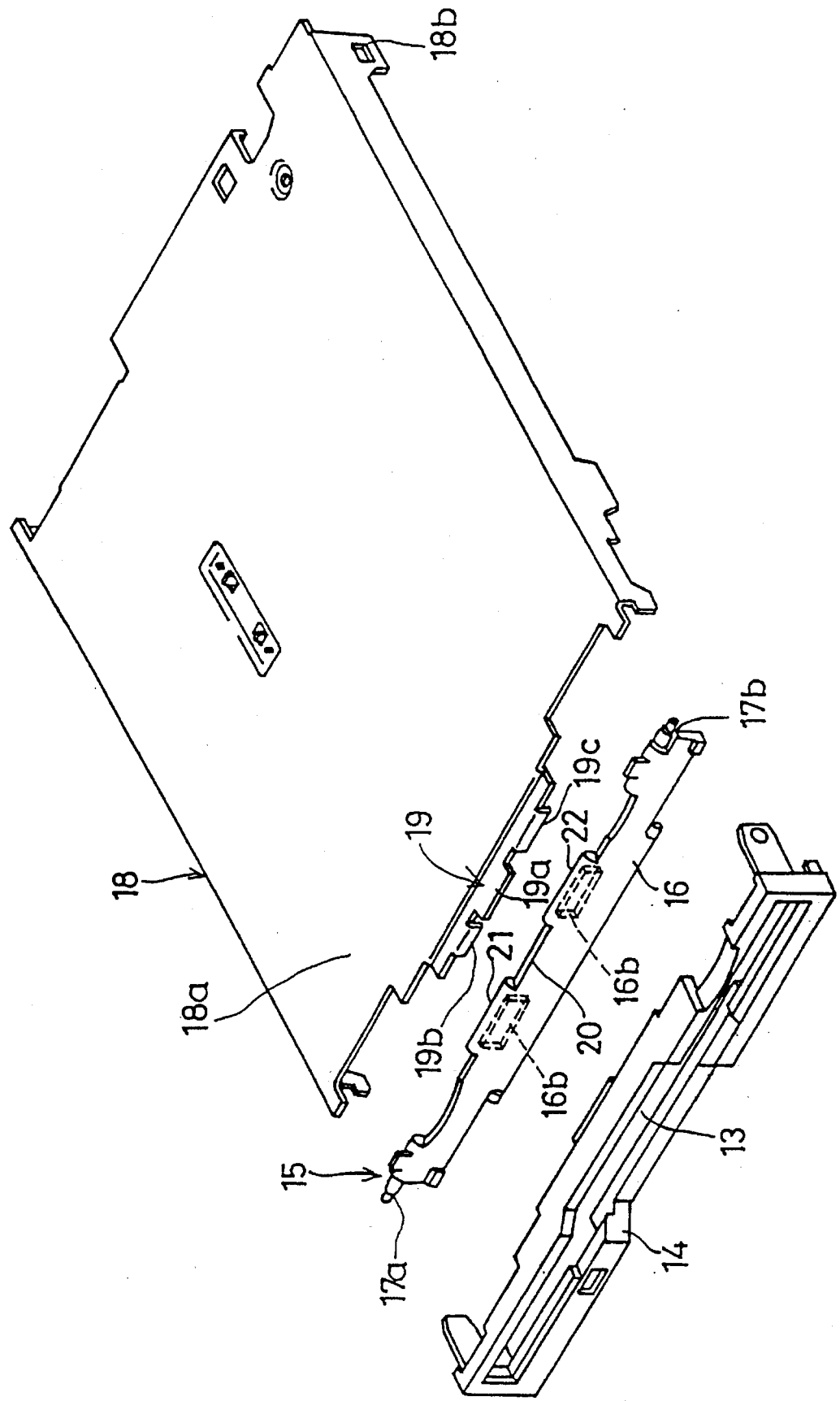
FIG.5 shows an exploded perspective view of a front bezel, lid and shielding cover constituting the magnetic disc apparatus of FIG.4.

In the embodiment of FIG.5 according to the present invention, means for supporting the lid 16 from the top side portion of the front bezel 14 is eliminated, though such supporting means is provided in the example of FIG.1 as mentioned above. As a result, the area required as the top side portion of the front bezel 14 can be made smaller so as to make the magnetic disc apparatus 11 thinner.

Actions will now be described whereby the disc cartridge in which the magnetic disc is contained is inserted into the magnetic disc apparatus 11 having the above mentioned construction.

Figure 6:
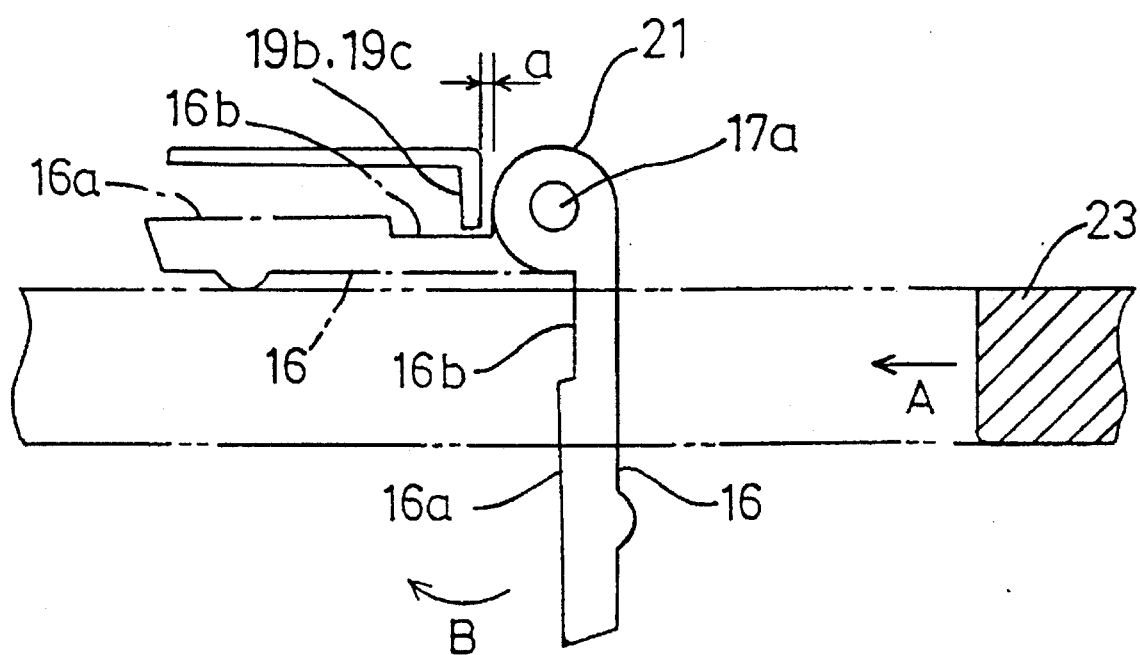
FIG.6 shows a side elevation view of the lid and a preventing member of the magnetic disc apparatus, also illustrating opening/closing actions of the lid.

As shown in FIG.6, the disc cartridge 23 is inserted into the disc insertion opening 13 along a direction A. The advancing edge of the disc cartridge 23 comes into contact with the lid 16 which has covered the disc insertion opening 13 at the rear side of the front bezel 14. As a result of the disc cartridge 13 coming into contact with the lid 16, the lid 16 rotates in a direction B.

If the disc cartridge 23 is inserted into the disc insertion opening 13 straightly along the direction A so as to press the lower portion of the lid 16, the lid 16 smoothly opens about the shafts 17a and 17b which shafts act as the rotation axis of the lid 16.

Figure 3:
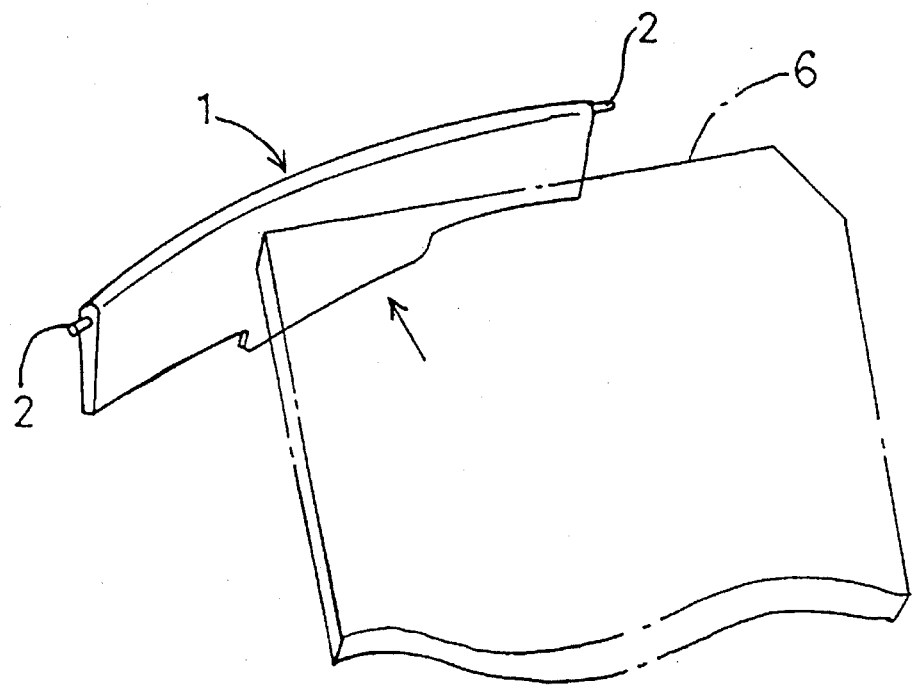
FIG.3 shows a perspective view of a lid of the mechanism of FIG.2 in a situation where the lid is deformed at the time of disc cartridge insertion.

However, there is a possibility that the disc cartridge 23 may be inserted into the disc insertion opening 13 along a top front direction, that is, may be inserted obliquely. If the disc cartridge 23 is inserted obliquely as mentioned above, the advancing edge of the disc cartridge 23 presses the upper portion of the lid 16 along the direction A. In this case, the middle portion of the lid 16 tends to bend backward as shown in FIG.3. There, the lid 16 is supported only by means of the side shafts 17a and 17b supported on the side walls of the frame 12 as mentioned above. However, in this embodiment according to the present invention, the lid 16 is prevented from over bending because the respective projections 21 and 22 come into contact with the respective second and third stoppers 19b and 19c, when the middle portion of the lid 16 is bent backward slightly by the distance a, so that the middle portion of the lid 16 is prevented from further bending. Such prevention is ensured by the construction wherein the second and third stoppers 19b and 19c face the rear side of the projections 21 and 22 formed on the lid 16 as mentioned above at a distance a from the projections.

As a result, the lid is prevented, by the pair of stoppers 19b and 19c, from over bending due to oblique or improper insertion of the disc cartridge 23. Consequently, tile lid 16 is prevented from being removed from the frame 12, such removal occurring as a result of the side shafts 17a and 17b fixed on the lid 16 being removed from the supporting holes (not shown in the drawings) as mentioned above, which holes are formed on the frame 12. Therefore, making the magnetic disc apparatus 11 thin can be achieved without problems arising. Thinness thus is achieved without degrading reliability in the disc-cartridge insertion operation.

The application of the present invention is not limited to such a magnetic disc apparatus but the present invention may be applied to other types of apparatuses treating recording media, such as, magneto-optical disc apparatus, and tape recorders into which a tape cassette is inserted, for example.

The means for preventing over-deformation of the lid 16 according to the present invention is not limited to a construction such as the stoppers 19b and 19c formed on the shield cover 18 in the embodiment of FIG.5. Another member which may be, for example, fixed in the magnetic disc apparatus 11 may be used for forming or mounting such over-deformation preventing means thereon so that the over-deformation preventing means faces and is in proximity to the rear surface of the lid 16.

In summarizing the above, the lid mechanism according to the present invention provides the over-deformation preventing means for preventing over-deformation appearing in the lid due to the insertion of the recording medium. In the embodiment, the preventing means is located so as to face and be in proximity to the middle portion of the rear surface of the lid. In this construction, if the advancing edge of the recording medium presses the middle portion of the front surface of the lid upon insertion of the recording medium, the lid is hardly bent. Thus, the over-deformation preventing means substantially acts to reinforce the lid construction and to prevent the lid from being removed due to the over bending thereof. As a result, the present invention offers thinning of the relevant apparatus without degrading reliability in the recording-medium insertion operation.

Further, the present invention is not limited to the above described embodiments, and variations and modifications may be made without departing from the scope of the present invention.

What is claimed is:

1. A lid mechanism for covering an opening formed in a body of a recording or reproducing apparatus and through which a recording medium means is inserted into, and removed from, the body, said lid mechanism comprising:

a lid rotatably supported in said body solely at pivot points formed on opposite ends of said lid, said pivot points forming a rotational axis for said lid that lies along an edge of said lid and that is positioned proximate to a peripheral edge of the opening, said lid having a generally planar covering portion extending from said rotational axis across said opening to cover said opening, said lid being contacted by the recording medium means when the recording medium means is being inserted in the body and pivoted about said rotational axis inwardly into the body to uncover said opening and allow the recording medium means to be inserted in the body along an insertion axis, said lid being subject to deforming forces, as a result of being contacted by the recording medium means, which cause said rotational axis and covering portion to become bowed so as to move central portions of said lid inwardly of the body, said lid having an engaging portion located proximate to said rotational axis in the central portions of said lid; and a lid deformation preventing member mounted on the inside of the body adjacent said engaging portion of said lid, said lid deformation preventing member being spaced behind said engaging portion by a predetermined distance in a direction parallel to the axis of insertion of the recording medium means into the body, said lid deformation preventing member extending from said inside of said body transversely of said parallel direction to engage said engaging portion of said lid when said lid is subjected to deforming forces to limit the deformation of said lid.

2. The lid mechanism according to claim 1, wherein said lid mechanism is further defined as a lid mechanism for a disc recording or reproducing apparatus; wherein said recording medium means comprises a disc cartridge containing an information recording disc; and wherein said opening is used for loading said disc cartridge on said disc recording or reproducing apparatus by inserting said disc cartridge into said recording or reproducing apparatus through said opening.

3. The lid mechanism according to claim 2, wherein said lid deformation preventing member is located immediately adjacent and behind said rotational axis of said lid mechanism, in the direction along which said disc cartridge is inserted into said opening.

4. The lid mechanism according to claim 2, wherein the body has a cover member (18) and wherein said lid deformation preventing member is formed on the cover member covering the body of the disc recording or reproducing apparatus.

5. The lid mechanism according to claim 1, wherein said pivot points comprise shaft means fixed on said lid and inserted in supporting holes formed on said periphery of said opening.

6. The lid mechanism according to claim 1, wherein said generally planar portion of said lid includes a surface extending from said rotational axis across said opening and wherein said surface has a depression extending generally normal to said generally planar portion for preventing the rotational action of said lid from being obstructed by said lid deformation preventing member as a result of said lid deformation preventing member projecting into said depression when said lid is rotated inwardly into the body.

\* \* \* \* \*